US008818794B2

(12) United States Patent
Archer et al.

(10) Patent No.: US 8,818,794 B2
(45) Date of Patent: Aug. 26, 2014

(54) ENVIRONMENT SENSITIVE PREDICTIVE TEXT ENTRY

(75) Inventors: Donald G. Archer, Euless, TX (US);
Andrien J. Wang, Keller, TX (US);
Aravind Perumandla, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 227 days.

(21) Appl. No.: 13/429,501

(22) Filed: Mar. 26, 2012

(65) Prior Publication Data
US 2013/0253906 A1 Sep. 26, 2013

(51) Int. Cl.
*G06F 17/27* (2006.01)
(52) U.S. Cl.
USPC .......................................... 704/9
(58) Field of Classification Search
USPC .......................................... 704/9
See application file for complete search history.

(56) References Cited

U.S. PATENT DOCUMENTS 8,571,862 B2 * 10/2013 Rao et al. ............... 704/235

* cited by examiner

*Primary Examiner* — Susan McFadden

(57) ABSTRACT

Environmental factors may be used in a predictive text system provided in a device. The device may receive one or more characters entered by a user and determine, based on the one or more characters, words that are predicted to be words being entered by the user of the device, where the words are determined using grammar-based predictive techniques. The device may determine confidence scores, corresponding to the words. The device may refine the scores based on environmental data that includes data that describes an environment associated with the user of the device. The device may select, based on the refined plurality of scores, a subset of the plurality of words and output the subset of the plurality of words.

21 Claims, 8 Drawing Sheets

ENVIRONMENT SENSITIVE PREDICTIVE TEXT ENTRY

BACKGROUND

Many electronic devices provide an option for a user to enter information. For example, a mobile device (e.g., a smart phone) may use an input device, such as a keypad or a touchscreen, for receiving user input. A touchscreen may send a signal to the device when a user touches a virtual object on the touchscreen with a finger or a pointing device.

In order to maximize portability, manufacturers frequently design mobile devices to be as small as possible. One problem associated with small mobile devices is that there may be limited space for the user interface. For example, the size of a display, such as a touchscreen display, may be relatively small. Similarly, for mobile devices that include a keyboard or keypad, the keys may be smaller or more tightly arranged than a "normal" one. The small display size or key size may make it difficult for the user to easily interact with the mobile device.

To assist users in entering text via keypads or touchscreens, predictive text entry techniques are known in which the current set of characters, entered by the user, are used to predict one or more words. The predicted words may be presented to the user. The user may choose one of the predicted words to complete the word that the user is currently entering.

DETAILED DESCRIPTION OF PREFERRED EMBODIMENTS

The following detailed description refers to the accompanying drawings. The same reference numbers in different drawings may identify the same or similar elements.

Techniques described herein may provide for predictive text as part of a text input system. The text may be predicted based on environmental factors relating to the user. The environmental factors may include factors derived from or based on information relating to the user's current environment or activities. The environmental factors may be used to modify or refine a set of predicted words that are determined based on techniques that use grammar and/or usage statistics.

In one example implementation, the environmental prediction techniques may be performed in a layered manner, in which one or more environment prediction modules operate to refine sets of predicted words. The environment prediction modules may be implemented in series in a mobile device, in which each environment prediction module may modify prediction scores, relating to the predicted words, of a previous environment prediction module.

An example series of environment prediction modules may include a "weather processing" module, a "calendar processing" module, and a "location processing" module. The weather processing module may operate to refine predicted words based on the current weather at the location of a user. For example, during cold weather, words relating to cold weather, such as gloves or hats, may be given preference. The calendar processing module may operate to refine the predicted words based on the current date. For example, if the current date is near Valentine's Day, words that may be associated with Valentine's Day, such as flowers or jewelry, may be given preference. The location processing module may similarly operate to modify the predicted words based on a current location of the user.

Figure 1:
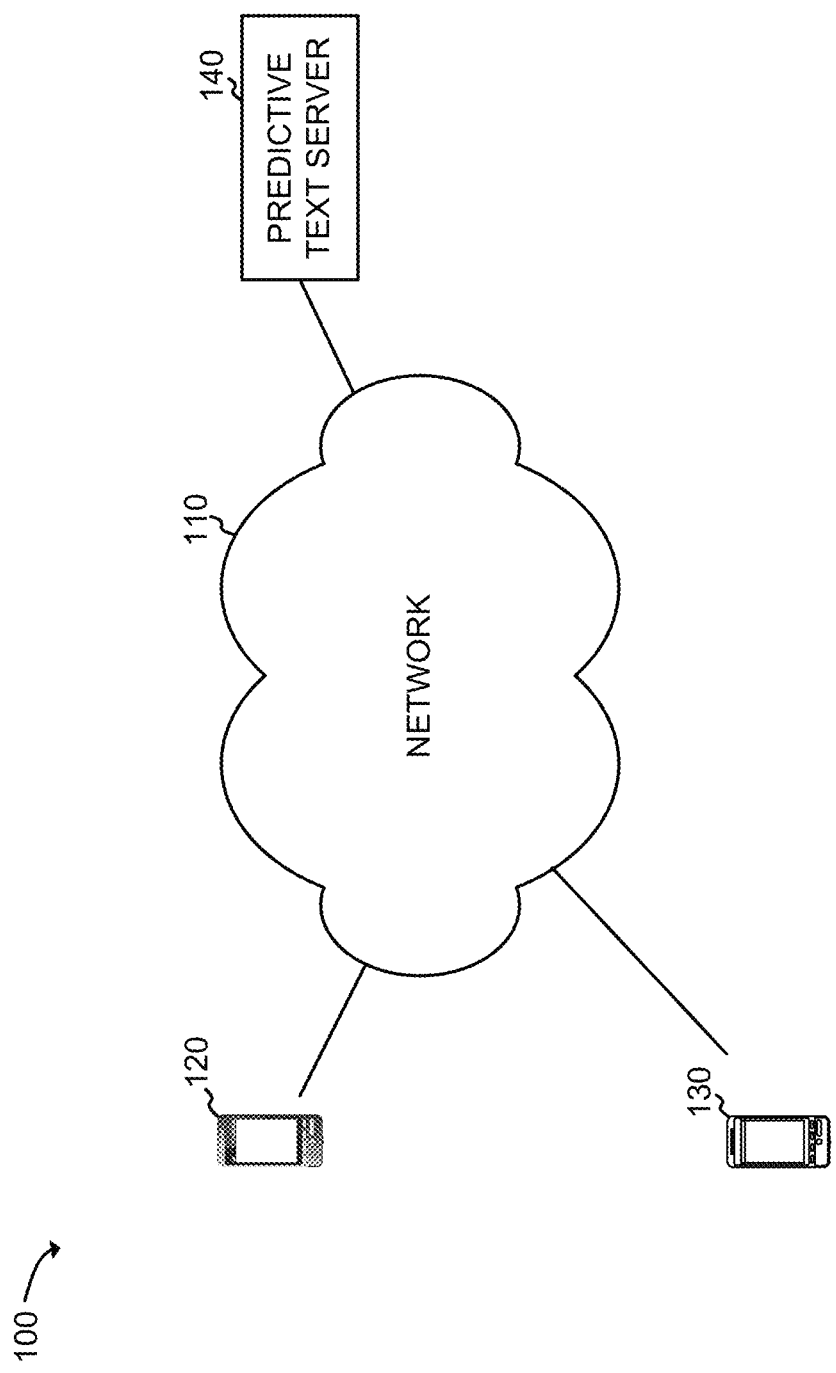
FIG. 1 is a diagram of an example environment in which systems and/or methods described herein may be implemented.

FIG. 1 is a diagram of an example environment 100 in which systems and/or methods described herein may be implemented. As illustrated, environment 100 may include a network 110 that connects a number of devices and/or systems. The devices and/or systems may include mobile devices 120 and 130 and a server, labeled as predictive text server 140.

Network 110 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, or a combination of networks. Network 110 may particularly include one or more wireless portions that provide wireless connectivity to mobile devices 120 and 130.

Mobile devices 120 and 130 may include portable computing and communication devices, such as a personal digital assistant (PDA), a smart phone, a cellular phone, a laptop computer with connectivity to a cellular wireless network, a tablet computer, etc. Mobile devices 120 and 130 may connect, through a radio link, to network 110.

Mobile devices 120 and 130 may provide textual input interfaces that use predictive text entry. For example, mobile devices 120/130 may include touchscreen displays through which a user can enter text through a virtual keyboard presented on the touchscreen display. The user may input one or more characters via the touchscreen display, such as by tapping keys on the virtual keyboard. Mobile devices 120/130 may generate, based on the current set of characters that were entered by the user, one or more predictions, where each prediction may be a word or a phrase that the user may be inputting. In one implementation, mobile devices 120/130 may generate the predictions using a locally implemented predictive text component (e.g., software executed by mobile devices 120/130). In an alternative implementation, mobile devices 120/130 may generate the predictions based on a predictive text component implemented remotely by predictive text server 140 or based on a combination of a locally implemented and remotely implemented predictive text component. Techniques for implementing the predictive text component will be described in more detail below.

Environment 100 may additionally include predictive text server 140, which may connect to network 110. Predictive text server 140 may include, for example, web servers, application servers, or other types of servers that provide services or functionality to mobile devices 120/130. Predictive text server 140 may generally act to provide predicted text as a network service, to mobile devices 120/130, or to assist mobile devices 120/130 in the generation of predicted text, such as by providing prediction rules or grammar to mobile devices 120/130.

One network 110, two mobile devices 120 and 130, and one server 140 are illustrated in FIG. 1 for simplicity. In practice, there may be additional or fewer networks 110, mobile devices 120/130 and/or servers 140.

Although FIG. 1 shows example components of environment 100, in other implementations, environment 100 may contain fewer components, different components, differently arranged components, or additional components than those depicted in FIG. 1. Alternatively, or additionally, one or more components of environment 100 may perform one or more other tasks described as being performed by one or more other components of environment 100.

Figure 2:
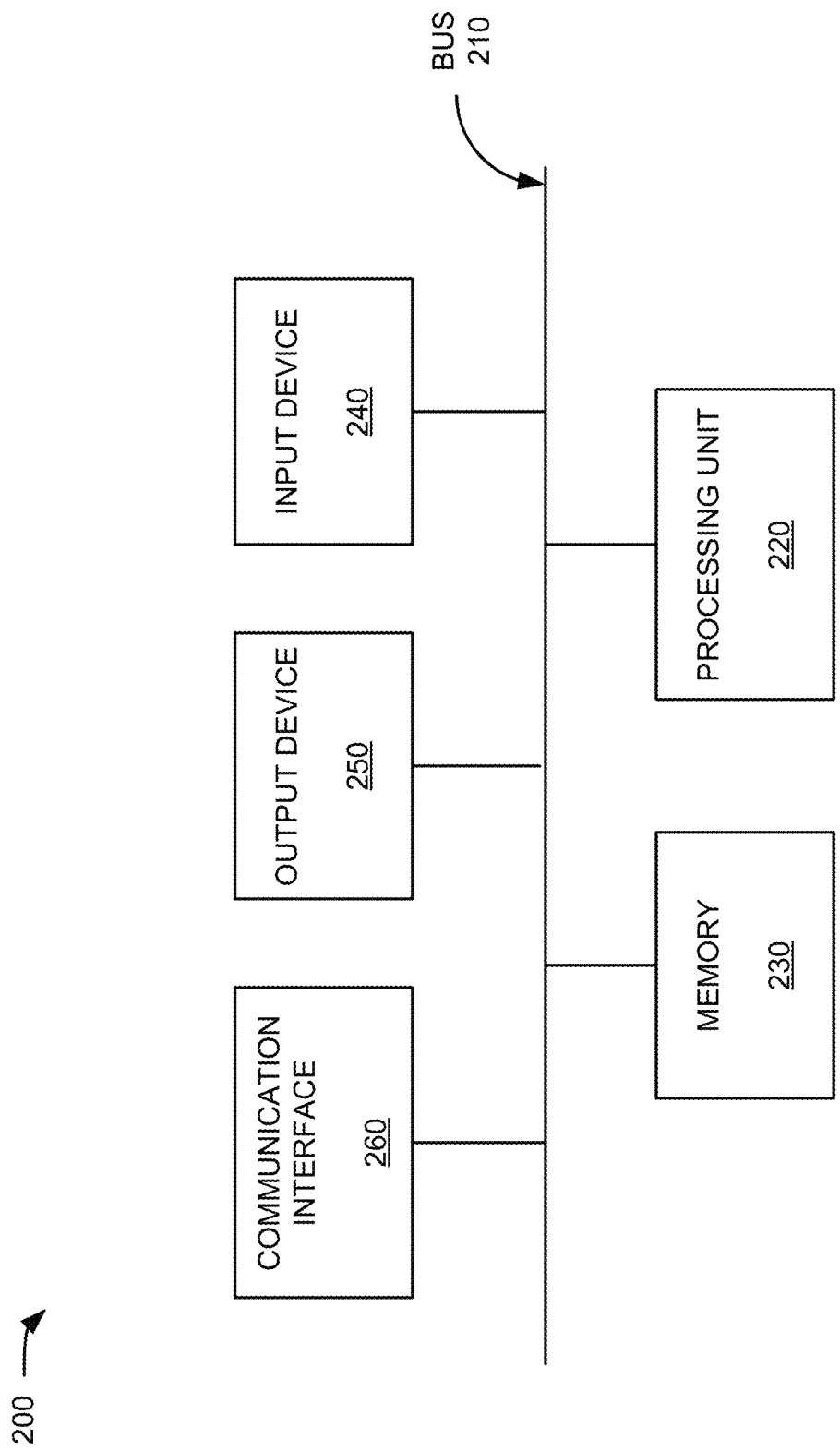
FIG. 2 is a diagram of example components of a device that may correspond to one or more devices of the environment of FIG. 1.

FIG. 2 is a diagram of example components of a device 200 that may correspond to one or more devices of environment 100, such as one of mobile devices 120/130 or predictive text server 140. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more Application Specific Integrated Circuits (ASICs), Field Programmable Gate Arrays (FPGAs), or the like.

Memory 230 may include a random access memory (RAM) or another type of dynamic storage device that stores information and instructions for execution by processing unit 220, a read-only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touchscreen display, one or more biometric mechanisms, and the like. When device 200 includes one of mobile devices 120/130, input device 240 may particularly include a touchscreen display or a keyboard or keypad design for mobile devices 120/130. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices associated with environment 100. When device 200 includes one of mobile devices 120/130, communication interface 260 may include antennas and other circuitry associated with wireless communication.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
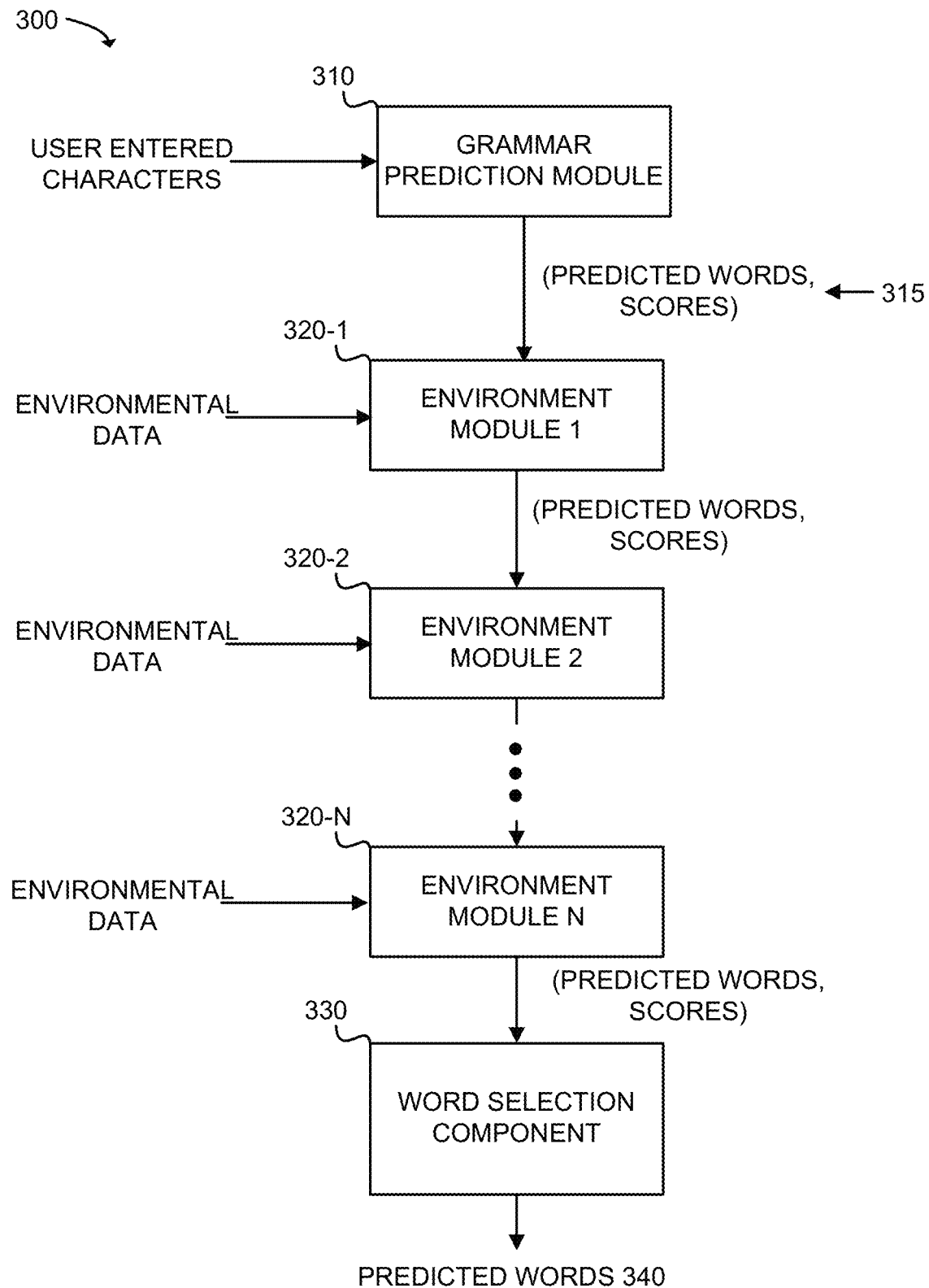
FIG. 3 is a diagram of example functional components of a predictive text component.

FIG. 3 is a diagram of example functional components of a predictive text component 300. Predictive text component 300 may include a number of modules, where each module may operate to generate candidate words or phrases (referred to as "predicted words" herein) and corresponding scores. Alternatively or additionally, a module may refine the score of previous modules. Each predicted word may correspond to a word or phrase that is likely to be a word or phrase that a user is currently entering. The score of each predicted word may quantify a confidence, assigned by predictive text component 300, that the predicted word is the word or phrase being entered by the user. In general, and as used herein, higher scores may indicate a higher confidence that the predicted word is the word or phrase being entered by the user.

As mentioned, predictive text component 300 may predict a word or phrase as a word or phrase that the user is likely to be entering. In the following description, predictive text component 300 will generally be discussed as predicting words. As used herein, prediction of a word may refer to prediction of a single word or prediction of a phrase (i.e., multiple words).

As shown in FIG. 3, predictive text component 300 may include a grammar prediction module 310, a number of environment modules 320-1 to 320-N (where N is >=1), and a word selection component 330.

Grammar prediction module 310 may receive one or more characters and may determine one or more predicted words. The predicted words may be determined based on grammar and/or usage statistics relating to a user of mobile device 120/130. Prediction of words based on grammar and/or usage statistics is known in the art and will not be described in detail herein. For example, grammar prediction module 310 may include a dictionary of words, where each entry in the dictionary may be associated with a score corresponding to the frequency with which the word tends to occur. Grammar prediction module 310 may potentially use rules relating to the syntax of the language to predict words. Grammar prediction module 310 may use historical usage statistics, of the user, when determining predicted words. For example, grammar prediction module 310 may determine that a particular user frequently enters a particular set of words. The set of words may be preferentially chosen as predicted words.

Predicted words/scores 315 may be output by grammar prediction module 310 and may include a set of one or more predicted words and corresponding scores. In some implementations, the maximum number of items in predicted words/scores 315 may be predetermined. For instance, grammar prediction module 310 may output a number X (where X>=1) of words with the highest corresponding scores. Alternatively, or additionally, grammar prediction module 310 may output any word with a score above a certain threshold value.

Each of environment modules 320 may each refine the set of predicted words/scores that were generated by the previous module. The predicted words/scores may be refined based on environmental data input to an environment module 320. The environmental data may include data that is external to the user and that describes an environment or a situation of the user. The environmental data may include, for example, data relating to: the current weather conditions, the user's current location, the date, or other information. Alternatively, or additionally, the environmental data may also relate to other information associated with the user, such as data derived from a user's calendar, data from social networks of which the user is a member, etc.

Refining the set of predicted words/scores may include modifying the scores associated with each of the words. For instance, scores of certain words may be boosted or attenuated by environment modules 320. Alternatively, or additionally, an environment module 320 may add a new predicted word and score to the current set of predicted words and scores. Techniques for refining the scores of predicted words and/or for adding new predicted words, to the current set of predicted words, will be described in more detail below.

Word selection component 330 may output a final set of predicted words 340, which may correspond to the words that are provided to the user as part of a text input interface. In one implementation, word selection component 330 may output a certain quantity of predicted words that have the highest scores. The quantity of words to output may be predetermined or may be based on other factors, such as a quantity of predicted words that fill a certain portion of a graphical interface.

In one implementation, predictive text component 300 may generate a new set of predicted words and corresponding scores in response to each character entered by the user. Thus, after every character is entered by the user, an updated set of predicted words may be shown to the user.

Although FIG. 3 shows example functional components of word prediction component 300, in other implementations, word prediction component 300 may contain fewer functional components, different functional components, differently arranged functional components, and/or additional functional components than those depicted in FIG. 3. Alternatively, or additionally, one or more functional components of word prediction component 300 may perform one or more other tasks described as being performed by one or more other functional components of word prediction component 300.

Figure 4:
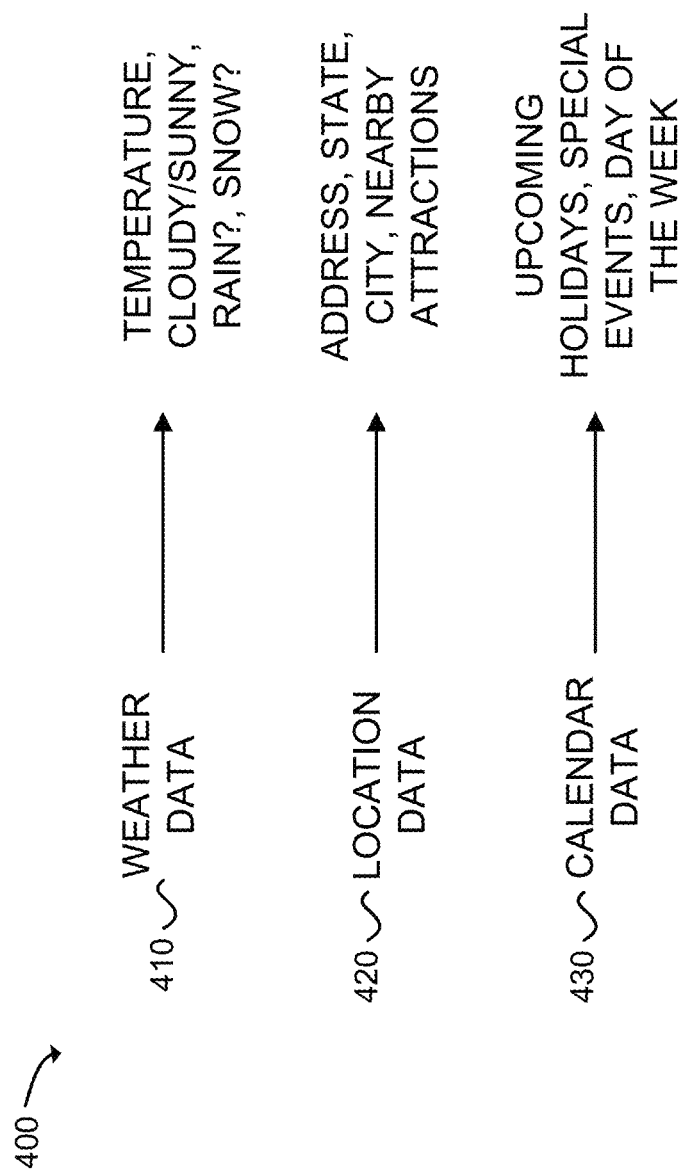
FIG. 4 is a diagram of example environmental data that may be input to environment modules of the predictive text component shown in FIG. 3.

FIG. 4 is a diagram illustrating an example of environmental data 400 that may be input to environment modules 320. Environmental data 400 may include data generated locally by mobile device 120/130, or data received from an external source, such as predictive text server 140 or another server. As illustrated, in this example, environmental data 400 may include weather data 410, location data 420, and calendar data 430. Types of environmental data, other than that shown in FIG. 4, may alternatively or additionally be used.

Weather data 410 may include data relating to current or future weather conditions in the vicinity of the user. Weather data 410 may including parameters describing, for instance, the current temperature (or the forecast high or low daily temperature), whether it is cloudy or sunny, whether it is currently raining or it is forecast to rain, whether it is currently snowing or it is forecast to snow, etc.

Location data 420 may include data relating to the current location of a user. The location of a user may be obtained by mobile device 120/130 through, for example, global positioning system (GPS) techniques or based on a wireless base station to which mobile device 120/130 is connected. Based on location data 420, parameters relating to the location of the user may be obtained. The parameters may include, for example: a street address, the state in which the user is located, the city in which the user is located, nearby attractions to the user (e.g., parks, shopping, restaurants), etc.

Calendar data 420 may include data relating to the current date. Parameters relating to calendar data 420 may include upcoming holidays, special events, the day of the week, etc.

Figure 5:
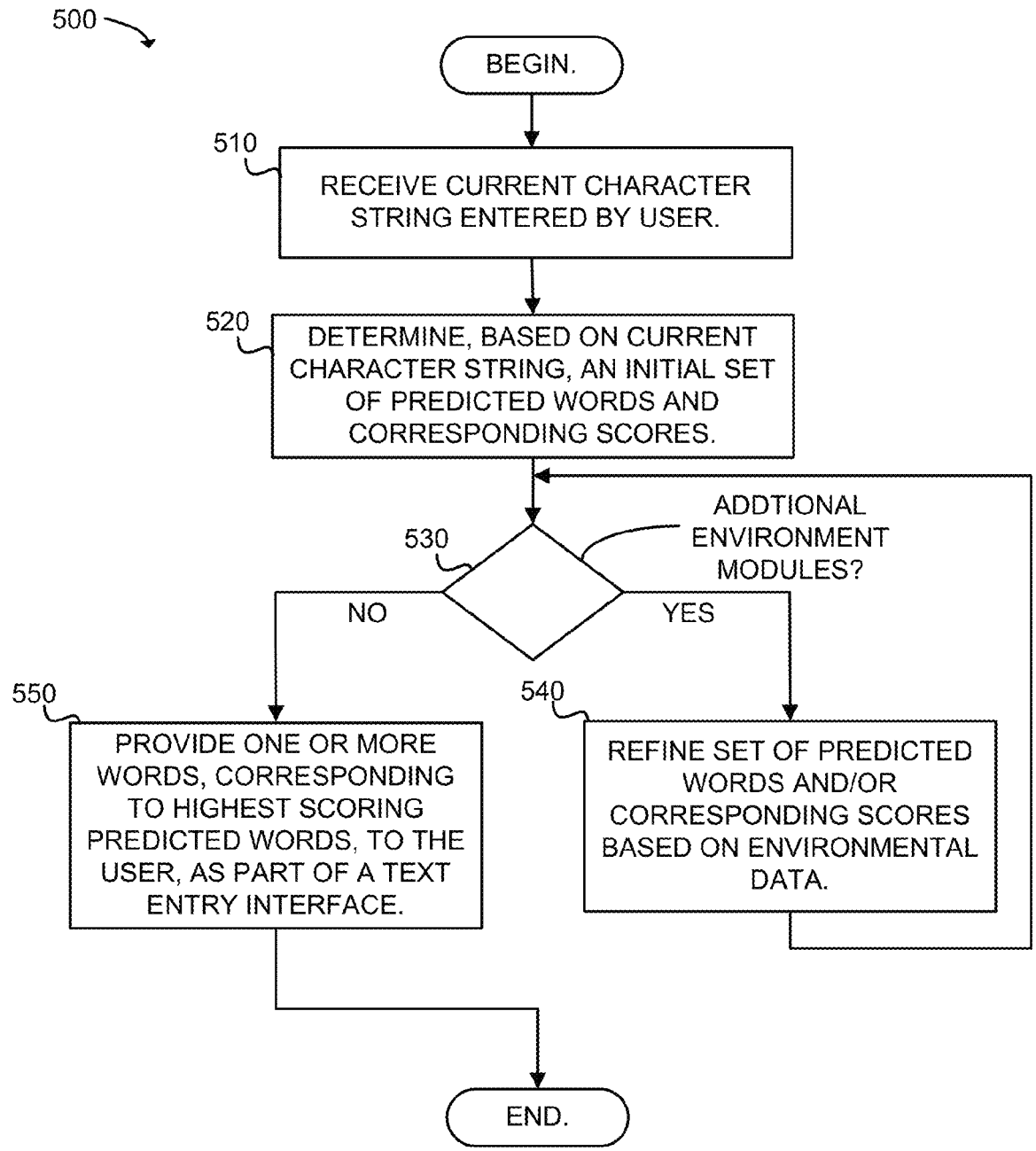
FIG. 5 is a flow chart illustrating an example process for performing predictive text entry based on environmental data.

FIG. 5 is a flow chart illustrating an example process 500 for performing predictive text entry based on environmental data. In one implementation, process 500 may be performed by mobile devices 120/130. Alternatively, process 500 may perform by mobile devices 120/130 in conjunction with predictive text server 140.

Process 500 may include receiving a current character string that is being entered by a user of a mobile device (block 510). The character string may be entered using, for example, a touchscreen display or a keypad associated with mobile device 120/130. In one implementation, process 500 may be performed for each character entered by the user. For example, process 500 may predict a set of potential words after the user enters the characters "go" and process 500 may again be performed when the user enters the next character, such as the character "1", to form the current character string "gol."

Process 500 may further include determining, based on the current character string, an initial set of predicted words and corresponding scores (block 520). The initial set of predicted words and corresponding scores may be generated by grammar prediction module 310. As previously mentioned, the predicted words may be determined based on grammar and/or usage statistics relating to a user of mobile device 120/130. The score for each predicted word may generally relate to the estimated likelihood or the confidence, by grammar prediction module 310, that the predicted word is a word that the user is currently entering.

Process 500 may further include refining the initial set of predicted words and corresponding scores using environment modules 320. In particular, process 500 may include determining whether there are additional environment modules available to process (block 530). When additional environment modules are available to process (block 530—YES), process 500 may include refining the set of predicted words and/or corresponding scores based on environmental data (block 540). A number of techniques can be used to implement environment modules 320. In one implementation, rules may be predefined, such as manually defined rules or rules that are automatically determined through analysis of historical environmental data and corresponding user text entries. Rules may relate parameters, corresponding to the environmental data, to modifications to the predicted word scores.

In one implementation, environment modules 320 may receive the rules from predictive text server 140. This may allow environment modules 320 to be updated to reflect the most recent set of rules. Alternatively, or additionally, the rules may be applied by predictive text server 140. In this implementation, predictive text server 140 may operate as an online application server from which mobile devices 120/130 request predicted words or an applicable set of rules. Alternatively, or additionally, when productive text component 300 initially begins to operate, predictive text server 140 may determine the weather forecast for the location associated with mobile device 120/130, and may transmit prediction rules relating to the current weather forecast to mobile device 120/130. These prediction rules may be applied by an environment module 320 that is designed to make weather-based word predictions.

Figure 6:
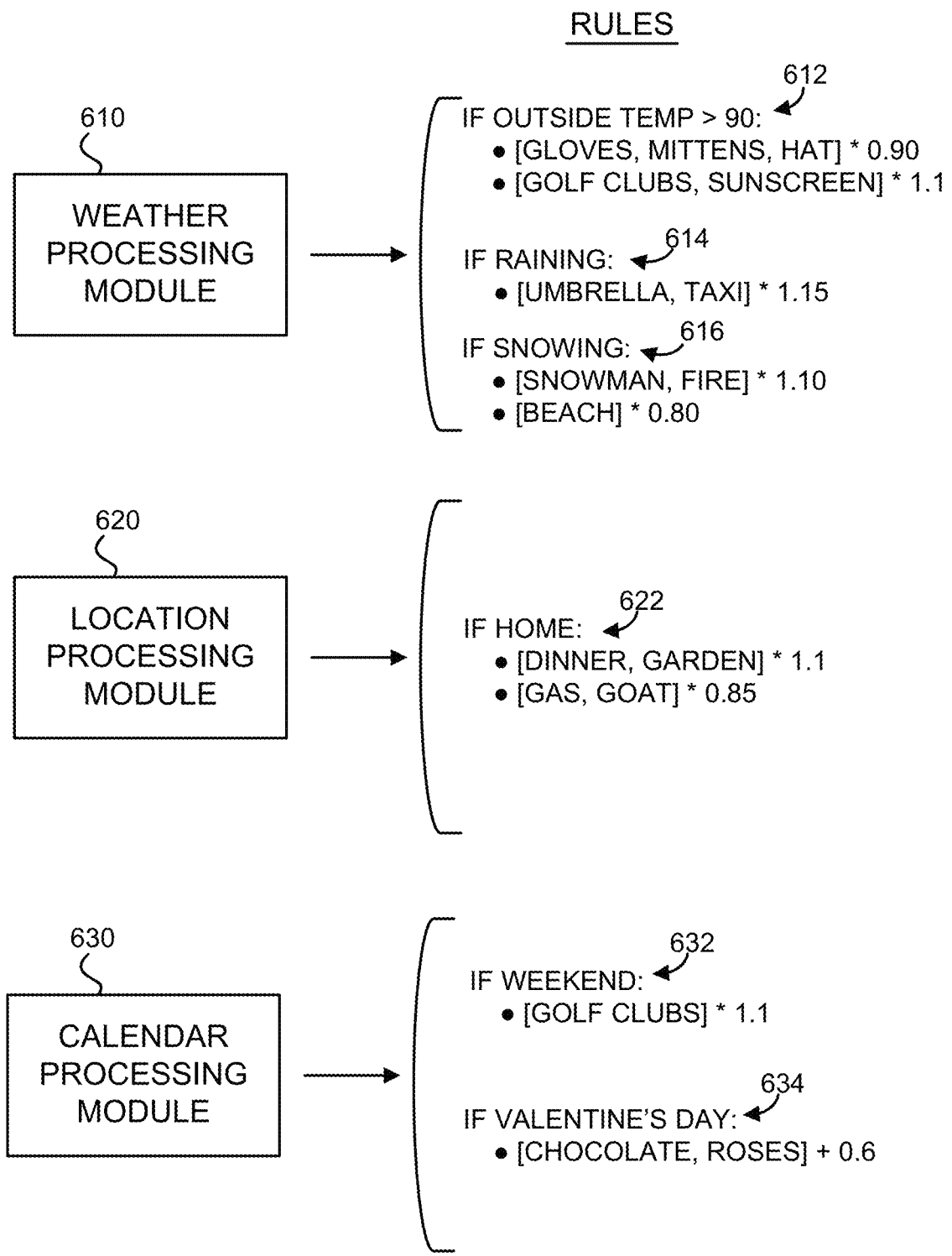
FIG. 6 is a diagram illustrating an example set of rules that may be defined for example environment modules.

FIG. 6 is a diagram illustrating an example set of rules that may be defined for three example environment modules 320. The example environment modules 320 may include a weather processing module 610, a location processing module 620, and a calendar processing module 630.

Assume that weather processing module 610 receives weather-related data describing the current temperature and whether it is currently raining or snowing. Weather processing module 610 may include rules 612, 614, and 616. Rule 612 may be triggered when the outdoor temperature is greater than 90 degrees and may act to boost or attenuate the scores of certain words. As illustrated, the scores of the words "gloves," "mittens," and "hat" may be multiplied by the factor 0.90 (attenuated) when the outside temperature is greater than 90 degrees. These may be words that are less likely to be used during hot weather. The scores for the words "golf clubs," and "sunscreen," in contrast, may be multiplied by the factor 1.1 (boosted) when the outside temperature is greater than 90 degrees. These may be words that are more likely to be used during hot weather. Rule 614 may similarly act to boost the scores for the words "umbrella" and "taxi" when it is raining Rule 616 may act to boost the scores of the words "snowman" and "fire" when it is snowing and may attenuate the score of the word "beach" when it is snowing.

Location processing module 620 may receive data relating to the current location of a user of mobile device 120/130. Location processing module 620 may include rule 622. Rule 622 may be triggered when the user is at home, and may boost the scores of the words "dinner" and "garden," as these words may be words that are likely to be used by a user that is in their home. Similarly, rule 622 may attenuate the scores of the words "gas" and "goat," as these may be words that are not likely to be used by a user that is in their home.

As another example of an implementation of location processing module 620, consider the situation in which a user of a mobile device 120/130 is determined to be in or near a park. In this case, location processing module 620 may preferentially weight scores of words associated with a park, such as camping, nature, sleeping bag, tent, and etc.

Calendar processing module 630 may receive data relating to the current date and/or events associated with the current date. Calendar processing module 630 may include rules 632 and 634. Rule 632 may be triggered when the current date falls on a weekend. In this case, the score for the word "golf clubs" may be boosted. Rule 634 may be triggered when the current date is near Valentine's Day. In this case, the scores for the words "chocolate" and "roses" may be boosted. For rule 634, the boosting factor is shown as "+0.6" to indicate that score for these words should be increased by 0.6. This may have the effect of adding these words to the set of predicted words even when the input set of predicted words did not include these words (i.e., the input set of predicted words may effectively include these words with a score of zero).

Rules 612, 614, 616, 622, 632, and 634, as discussed with respect to FIG. 6, are examples. Other implementations of text prediction component 300 may include additional rules, potentially covering many additional words. Additionally, the scores for the predicted words may be modified using techniques other than multiplying a score by a constant or adding a constant to a score.

The rules discussed with respect to FIG. 6 represent one example set of rules that may be used to implement environment modules 320, such as weather processing module 610, location processing module 620, and calendar processing module 630. In practice, each environment module 320 may include many more rules that are either manually or automatically generated. Additionally, the form of the rules of FIG. 6 (i.e., simple conditional statements followed by a list of words associated with a modification factor) is illustrative. Other techniques and/or models may be used to refine a set of predicted words and/or scores based on environmental data.

Referring back to FIG. 5, at some point, all of environment modules 320 may have been processed. When there are no additional environment modules to process (block 530—NO), process 500 may further include providing one or more words, corresponding to the high-scoring predicted words, to the user, as part of a text entry interface (block 550). In one implementation, and as previously mentioned with respect to word selection component 310, a quantity of predicted words, having the highest scores, may be provided to the user. The quantity of words to output may be predetermined or may be based on other factors, such as a quantity of predicted words that fill a certain portion of a graphical interface.

Figure 7:
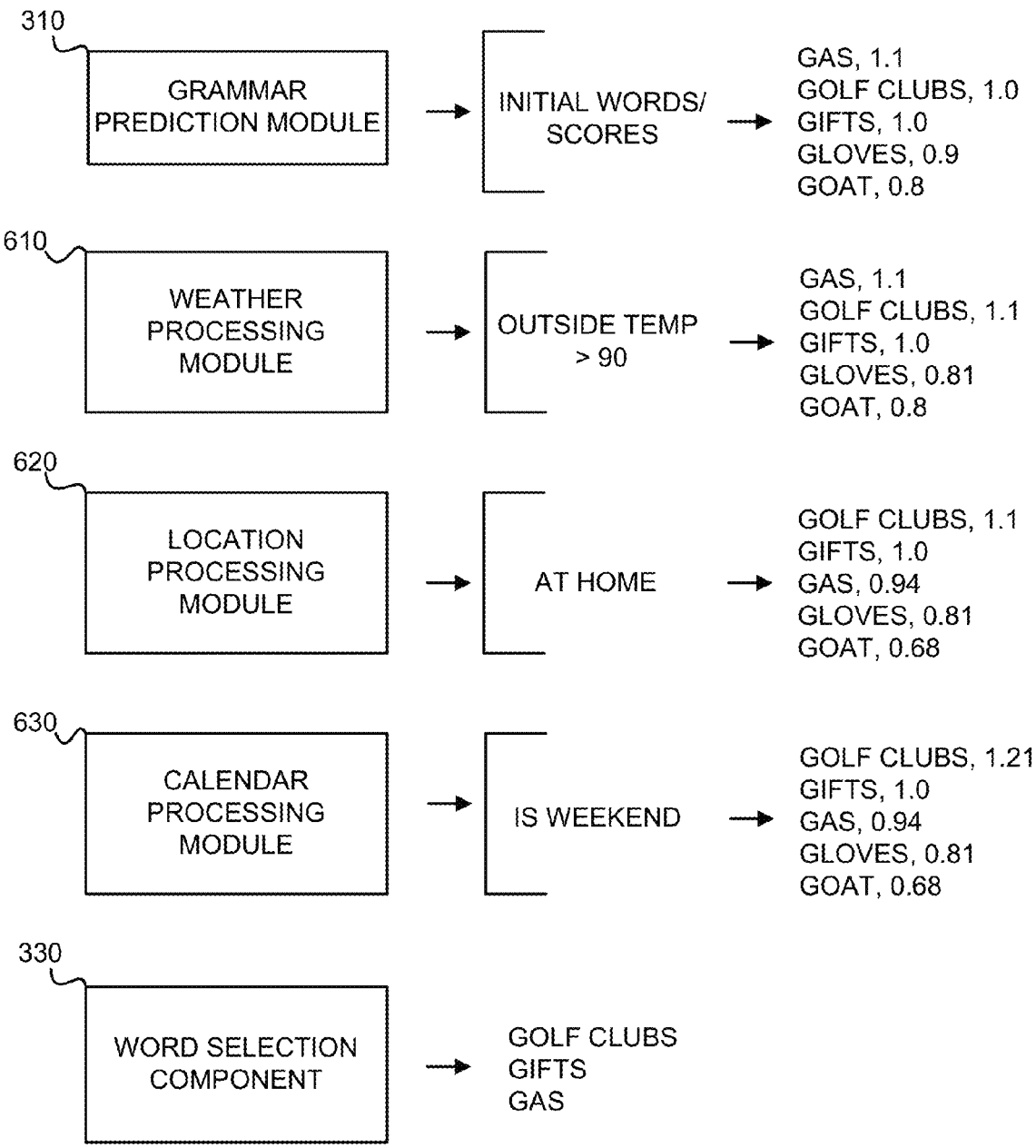
FIG. 7 is a diagram illustrating an example of text prediction using the environment modules illustrated in FIG. 6.

FIG. 7 is a diagram illustrating an example of text prediction using the environment modules illustrated in FIG. 6. In this example, assume that the user types the sentence "I need to buy g". Text prediction component 300 may operate to predict the word that the user is typing that begins with the letter "g".

Assume grammar prediction module 310, based on conventional grammar and/or usage statistics techniques, generates an initial set of predicted words and corresponding scores, which includes the entries: gas (score 1.1), golf clubs (score 1.0), gifts (score 1.0), gloves (score 0.9), and goat (score 0.8).

Assume that the outside temperature is greater than 90 degrees. Based on this, weather processing module 610 may reduce the score of gloves to 0.81 (0.9*0.9) and boost the score of golf clubs to 1.1 (1.0*1.1). Location processing module 620 may receive the predicted words and modified scores (as modified by weather processing module 610). Assume that the user is currently at home. Based on this, location processing module 620 may reduce the scores corresponding to goat and gas (goat may be reduced to 0.68 and gas may be reduced to 0.94). Calendar processing module 630 may receive the predicted words and modified scores (as modified by location processing module 620). Assume that it is currently a weekend. Calendar processing module 630 may boost the score corresponding to golf clubs to 1.21.

The final set of predicted words and scores may be received by word selection component 330. Word selection component 330 may, for example, select the predicted words (golf clubs, gifts, gas) with the top three scores, and present these words to the user in a text input interface.

Figure 8:
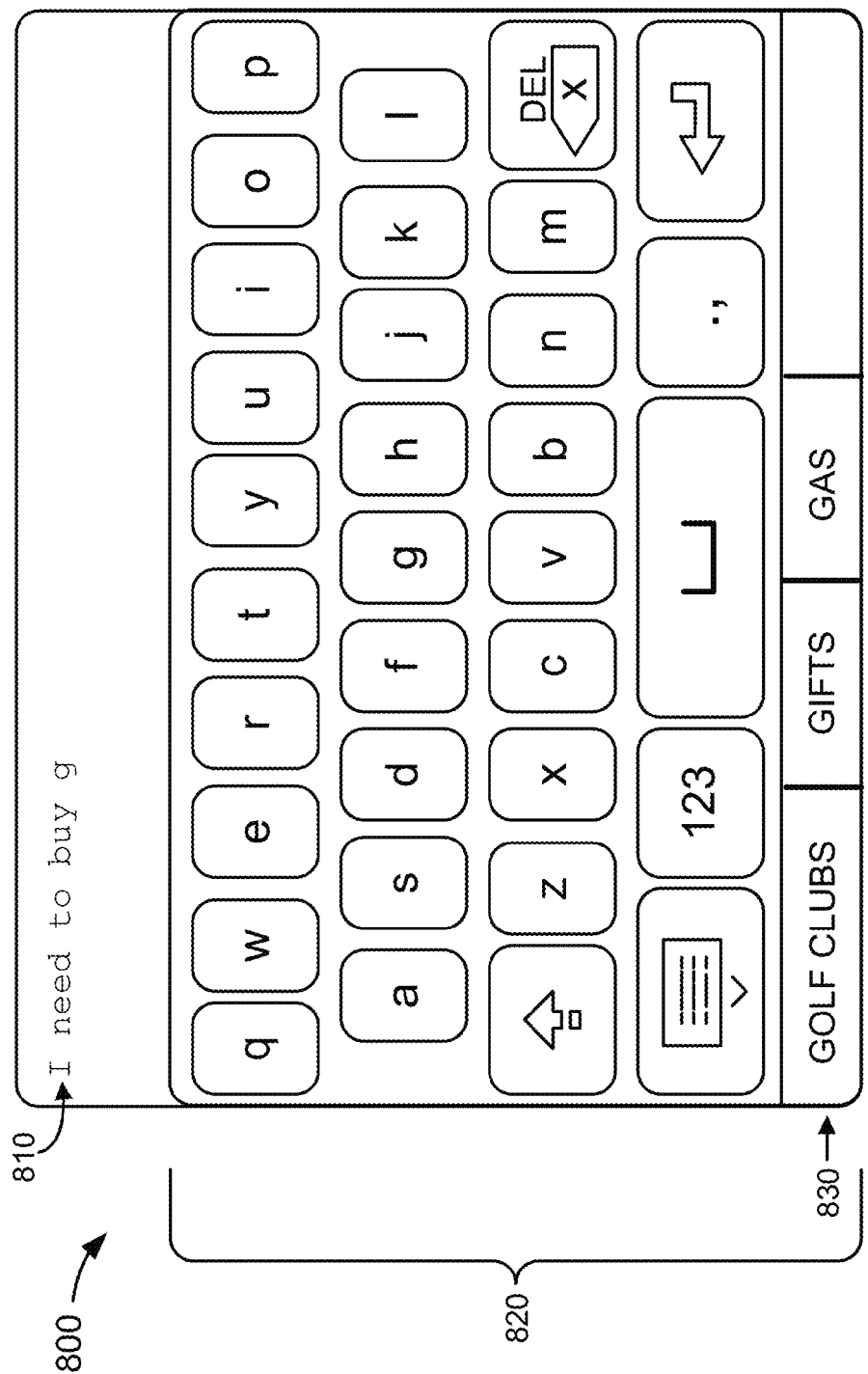
FIG. 8 is a diagram illustrating an example of a text input interface.

FIG. 8 is a diagram illustrating an example of a text input interface 800. Text input interface 800 may be provided on a touchscreen display of mobile device 120/130. Text input interface 800 may include a section 810 in which a user enters text in a virtual keyboard section 820. The text may be entered through a touchscreen keyboard 820. The words predicted by predictive text component 300 (golf clubs, gifts, and gas) may be provided to the user at the bottom of virtual keyboard 820 as predicted words 830. The user may select one of the words, such as by touching a box enclosing the word, to complete the sentence using the selected word. For example, if the user intends to write "I need to buy golf clubs," the user may simply select the "golf clubs" box of predicted words 830 instead of manually entering the rest of the characters in "golf clubs."

The foregoing description of implementations provides illustration and description, but is not intended to be exhaustive or to limit the invention to the precise form disclosed. Modifications and variation him and him and him s are possible in light of the above teachings or may be acquired from practice of the invention.

For example, while series of blocks have been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, implemented by a mobile device, the method comprising:
   receiving, by the mobile device, one or more characters entered by a user of the mobile device;
   determining, by the mobile device and based on the one or more characters, a plurality of words that are predicted to be words being entered by the user of the mobile device, the plurality of words being determined using grammar-based predictive techniques;
   determining, by the mobile device, a plurality of scores, corresponding to the plurality of words, each of the plurality of scores representing an estimated confidence that the corresponding one of the plurality of words is the word that is being entered by the user;
   refining, by the mobile device, the plurality of scores based on environmental data that includes data that describes an environment associated with the user of the mobile device, the refining of the plurality of scores including refining the plurality of scores based on rules that relate parameters of the environmental data to score modifications;
   selecting, by the mobile device and based on the refined plurality of scores, a subset of the plurality of words; and
   outputting, by the mobile device, the subset of the plurality of words, to a display of the mobile device, as predicted text that is selectable by the user to complete a word or phrase corresponding to the one or more characters entered by the user.

2. The method of claim 1, where each of the determined plurality of words includes a single word or a phrase.

3. The method of claim 1, where refining the plurality of scores based on the environmental data further includes:
   determining, based on the environmental data, additional words to add to the plurality of words.

4. The method of claim 1, where refining the plurality of scores based on the environmental data further includes:
   successively refining the plurality of scores by a plurality of environment modules, where each environment module, of the plurality of environment modules, refines the plurality of scores based on different environmental data.

5. The method of claim 4, where the plurality of environment modules include at least two of a weather-based module, a location-based module, and a calendar-based module.

6. The method of claim 1, where the environmental data includes data relating to a current location of the mobile device, the method further comprising:
   boosting a score of those of the plurality of words that are likely to be used, by the user, in association with the current location.

7. The method of claim 1, further comprising:
   receiving, by the mobile device, the rules from a remotely located server.

8. The method of claim 1, where the environmental data includes data relating to current weather conditions or a current weather forecast, the method further comprising:
   boosting a score of those of the plurality of words that are likely to be used, by the user, in association with the current weather conditions or the current weather forecast.

9. The method of claim 1, where the environmental data includes data relating to events occurring on a current date, the method further comprising:
   boosting a score of those of the plurality of words that are likely to be used, by the user, in association with the events occurring on the current date.

10. A device comprising:
    a processor to:
    receive one or more characters entered by a user of the device;
    determine, based on the one or more characters, a plurality of words that are predicted to be words being entered by the user of the device, the plurality of words being determined using grammar-based predictive techniques;
    determine a plurality of scores, corresponding to the plurality of words, each of the plurality of scores representing an estimated confidence that the corresponding one of the plurality of words is the word that is being entered by the user;
    refine the plurality of scores based on environmental data that includes data that describes an environment associated with the user of the device, the refining of the plurality of scores including refining the plurality of scores based on rules that relate parameters of the environmental data to score modifications;
    select, based on the refined plurality of scores, a subset of the plurality of words; and
    output, the subset of the plurality of words, to a display of the device, as predicted text that is selectable by the user to complete a word or phrase corresponding to the one or more characters entered by the user.

11. The device of claim 10, where each of the determined plurality of words includes a single word or a phrase.

12. The device of claim 10, where the processor is further to:
    refine the plurality of scores based on the environmental data by successively refining the plurality of scores by a plurality of environment modules, where each environment module, of the plurality of environment modules, refines the plurality of scores based on different environmental data.

13. The device of claim 10, where the environmental data includes data relating to a current location of the mobile device, and where the processor is further to:
   boost a score of those of the plurality of words that are likely to be used, by the user, in association with the current location.

14. The device of claim 10, where the environmental data includes data relating to events occurring on a current date, and where the processor is further to:
   boost a score of those of the plurality of words that are likely to be used, by the user, in association with the events occurring on the current date.

15. The device of claim 10, where the processor is further to:
   receive the rules from a remotely located server.

16. The device of claim 10, where the environmental data includes data relating to current weather conditions or a current weather forecast, and where the processor is further to:
   boost a score of those of the plurality of words that are likely to be used, by the user, in association with the current weather conditions or the current weather forecast.

17. A non-transitory computer-readable medium, comprising:
   one or more instructions that, when executed by one or more processors of a device, cause the one or more processors to:
      receive one or more characters entered by a user;
      determine, based on the one or more characters, a plurality of words that are predicted to be words being entered by the user, the plurality of words being determined using grammar-based predictive techniques;
      determine a plurality of scores, corresponding to the plurality of words, each of the plurality of scores representing an estimated confidence that the corresponding one of the plurality of words is the word that is being entered by the user;
      refine the plurality of scores based on environmental data that includes data that describes an environment associated with the user, the refining of the plurality of scores including successively refining the plurality of scores by a plurality of environment modules, where each environment module, of the plurality of environment modules, refines the plurality of scores based on different environmental data;
      select, based on the refined plurality of scores, a subset of the plurality of words; and
      output, the subset of the plurality of words, as predicted text that is selectable by the user to complete a word or phrase corresponding to the one or more characters entered by the user.

18. The non-transitory computer-readable medium of claim 17, where the environmental data includes data relating to current weather conditions or a current weather forecast, where the computer-readable medium further comprises:
   one or more instructions that, when executed by one or more processors of the device, cause the one or more processors to:
      boost a score of those of the plurality of words that are likely to be used, by the user, in association with the current weather conditions or the current weather forecast.

19. The non-transitory computer-readable medium of claim 17, where the environmental data includes data relating to events occurring on a current date, where the computer-readable medium further comprises:
   one or more instructions that, when executed by one or more processors of the device, cause the one or more processors to:
      boost a score of those of the plurality of words that are likely to be used, by the user, in association with the events occurring on the current date.

20. The non-transitory computer-readable medium of claim 17, where the environmental data includes data relating to a current location of the mobile device, where the computer-readable medium further comprises:
   one or more instructions that, when executed by one or more processors of the device, cause the one or more processors to:
      boost a score of those of the plurality of words that are likely to be used, by the user, in association with the current location.

21. The non-transitory computer-readable medium of claim 17, further comprising:
   one or more instructions that, when executed by one or more processors of the device, cause the one or more processors to:
      receive rules, at the device, from a remotely located server, the rules relating parameters of the environmental data to score modifications.

* * * * *